Figure 1:
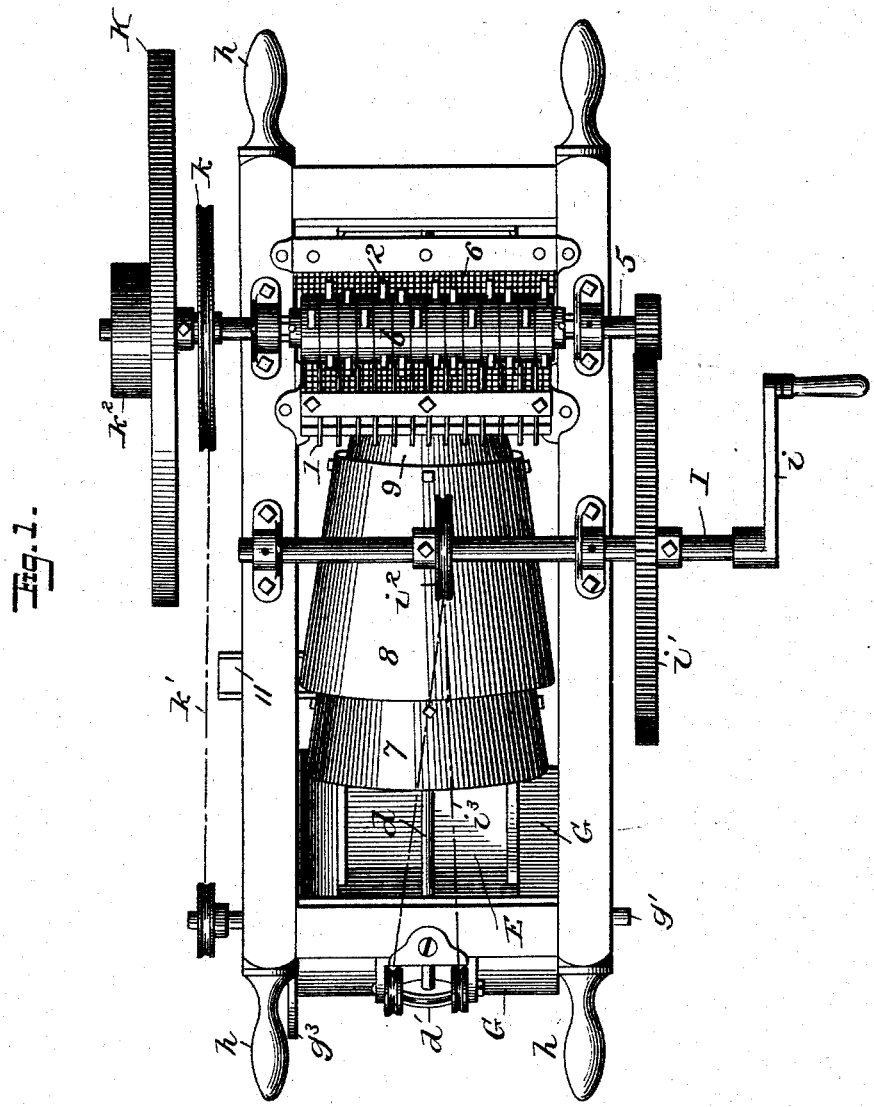

(No Model.) 2 Sheets—Sheet 1.

W. W. SMITH & G. R. HAYES.
TOBACCO GRANULATING, GRADING, AND SEPARATING MACHINE.

No. 483,292. Patented Sept. 27, 1892.

Witnesses
Wm. E. Neff
Jno. G. Hinkel

Inventors
Wm. W. Smith
George R. Hayes, by
J. A. Watson Attorney (No Model.) 2 Sheets—Sheet 2.
W. W. SMITH & G. R. HAYES.
TOBACCO GRANULATING, GRADING, AND SEPARATING MACHINE.
No. 483,292. Patented Sept. 27, 1892.
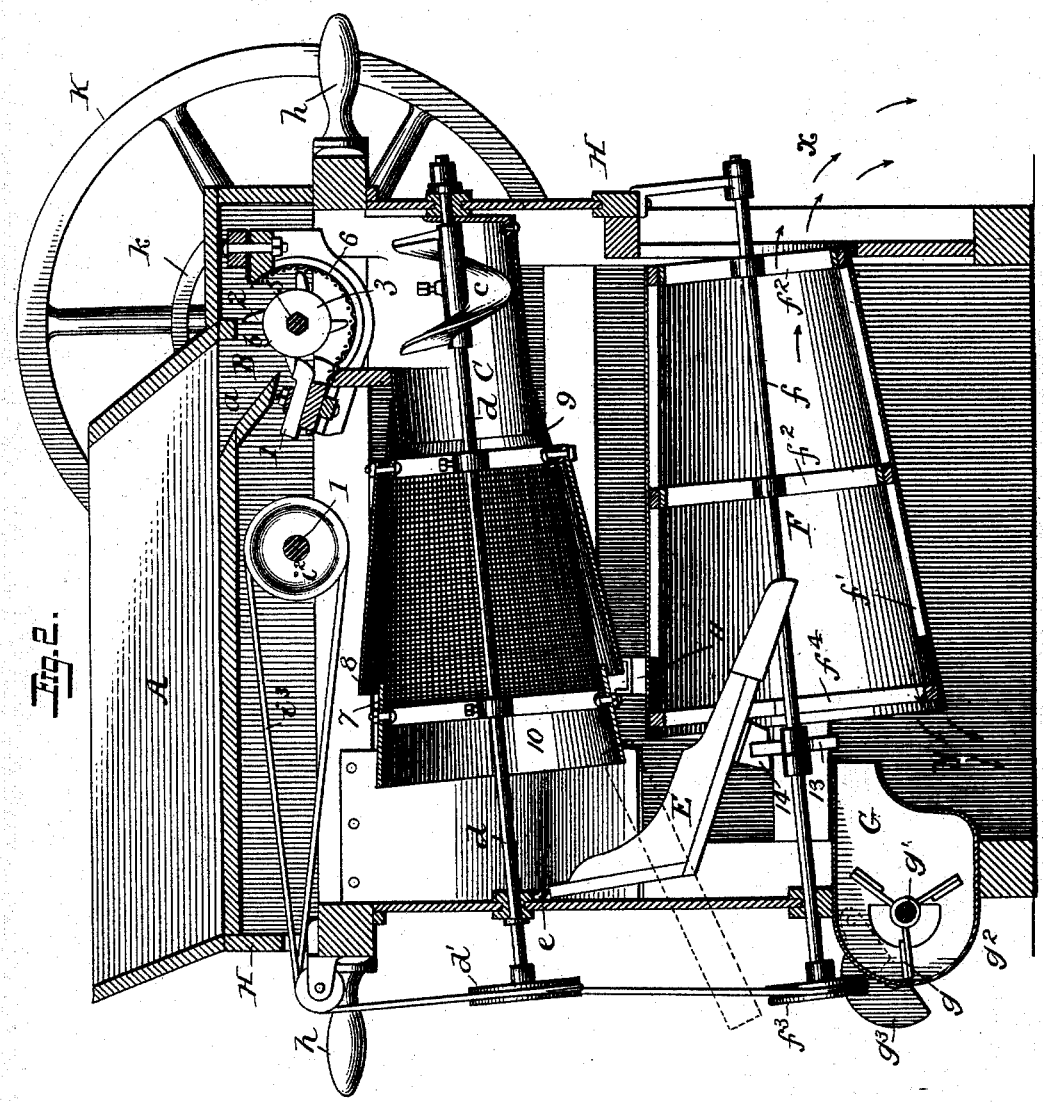
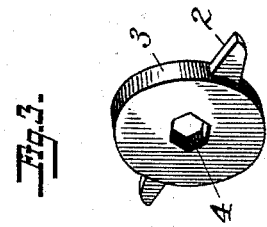
Witnesses  
Inventors  
Wm. W. Smith and  
George R. Hayes, by  
J. A. Watson, Attorney

UNITED STATES PATENT OFFICE.

WILLIAM W. SMITH AND GEORGE R. HAYES, OF YORK, PENNSYLVANIA; SAID SMITH ASSIGNOR TO SAID HAYES.

TOBACCO GRANULATING, GRADING, AND SEPARATING MACHINE.

SPECIFICATION forming part of Letters Patent No. 483,292, dated September 27, 1892.

Application filed November 19, 1891. Serial No. 412,432. (No model.)

*To all whom it may concern:*

Be it known that we, WILLIAM W. SMITH and GEORGE R. HAYES, citizens of the United States, residing at York, in the county of York and State of Pennsylvania, have invented certain new and useful Improvements in Tobacco Granulating, Grading, and Separating Machines, of which the following is a specification.

Our invention relates to tobacco granulating, grading, and separating machines; and it consists in an improved construction, combination, and arrangement of devices for granulating and grading the tobacco, cleaning it, and separating the stock from the stems.

In the accompanying drawings, in which like reference-signs refer to like parts throughout the several views, Figure 1 is a plan view of our improved machine with the hopper removed. Fig. 2 is a central sectional view of Fig. 1, parts being shown in side view; and Fig. 3 is a perspective of one of the sections of the granulator.

The general features of our improved machine are a hopper through which the tobacco to be treated is fed, a granulating and grading device, a screen for sifting out the sand and other fine particles or matter, and means for separating the leaf portion of the tobacco from the stems.

An important part of the invention consists in mechanism for separating the leaves or stock from the stems. This operation has heretofore been difficult to perform satisfactorily on account of the slight difference in specific gravity between the leaves and the stems; but by our improved mechanism hereinafter described we have been able to make a complete and rapid separation.

In the accompanying drawings, A indicates a hopper having an opening $a$ near one end, through which the material is fed to the granulator B. As shown, the granulator consists of a series of stationary knives 1, suitably attached to the frame of the machine, and teeth 2, arranged upon a revolving cylinder $b$, so as to pass between the knives. The cylinder $b$ in our improved construction is made up of sections 3, each provided with one or more of the teeth 2 and having a polygonal hole 4 in its center. These sections are mounted upon a polygonal shaft 5, corresponding in size and shape to the openings 4. The advantages of this arrangement are that the teeth may be cast integral with the sections of the cylinder instead of being set into said cylinder and that the sections may be set on the shaft so that the teeth of the several sections may be in any desired relation to each other. For instance, they may be in the same plane or arranged spirally or staggered. They are preferably arranged spirally, so as to pass in succession between the fixed knives.

Beneath and partially surrounding the cylinder $b$ is an interchangeable wire screen 6, of a mesh to correspond with the grade or size of stock desired, through which the ground material may pass, but which retains the larger material until it is ground sufficiently fine. This screen is concentric with the cylinder and just outside of the teeth and is carried up above the cylinder upon the side opposite the fixed knives, so as to throw the unground material back onto said knives.

As the ground tobacco falls from the granulator it is received in a semicylindrical trough C and fed along said trough by a worm $c$, mounted upon a shaft $d$. The trough C projects into a conical screen D, which is also mounted upon the shaft $d$. This screen is for the purpose of removing any sand or other fine dirt which may be present in the tobacco. It consists of a fine wire-netting 7 and an outer sheet-metal jacket 8. At each end of the netting 7 we prefer to add sheet-metal extensions 9 and 10, in line with the netting 7. A small trough 11 carries off the fine stuff, which passes through the netting 7 into the jacket 8.

The screen D is preferably made conical, so that the material which is delivered into its smaller end will travel by gravity toward and out of the larger end. This result is aided by inclining the shaft downward toward the larger end of the screen.

As the material falls from the lower end of the screen D it passes into a chute E and is conveyed by said chute into a revolving tubular receptacle F, which is mounted on the shaft $f$. The chute E is preferably agitated at intervals to facilitate the movement of the tobacco into the tube F. As shown, this is accomplished by cams 13, which are mounted on the shaft $f$, coming in contact with an arm 14, which projects downward from the chute E, the latter being pivoted at $e$ to the frame.

As shown in Fig. 2 of the drawings, F is a sheet-metal truncated cone or tapered tube mounted upon a shaft $f$. Along the inner surface of the cone are projecting longitudinal ribs $f'$, running in the direction of the shaft $f$. There may be also several strengthening-ribs $f^2$ within the cone at right angles to the ribs $f'$. A narrow band or rib $f^4$ extends around the inside near the larger or lower end of cone F, at a short distance from the ends of ribs $f'$, to retain the stock and stems in the cone until a proper separation of them is accomplished. Near the larger end of the cone or tube F is located a blower G, the mouth of which is arranged to direct the blast into the larger end of the tube in the direction of its axis. As shown, the blower consists of a series of rotating blades $g$, mounted on a shaft $g'$, and it is provided at either end of its casing $g^2$ with air-valves $g^3$ for regulating the blast.

The various portions of the machine above described are mounted upon a suitable framework H and provided with suitable driving mechanism for moving them either by hand or other power. The machine is portable and may be readily moved by means of handles $h$. The driving mechanism consists of a shaft I, having a crank and handle $i$, a gear-wheel $i'$, which meshes with a pinion upon the shaft 5 of the granulator, and a belt-wheel $i^2$, from which power is transmitted by a belt $i^3$ to pulleys $d'$ and $f^3$ upon the shafts $d$ and $f$, respectively. Upon the shaft 5 is a fly-wheel K and a belt-wheel $k$, from which power is transmitted to the blower through a crossed belt $k'$. Upon the shaft 5 I have also shown a belt-wheel $k^2$, which may be used as a driving-wheel when the machine is run by other than hand-power.

The operation of the machine is as follows: Tobacco-leaves in the rough state in which they come from the curing-house are fed through into the granulator and there broken up until the pieces are small enough to pass through the perforations in the screen 6. The tobacco is then fed by the worm $c$ into the revolving screen D, which separates out all of the sand and other dirt and delivers the same into the chute I. The tobacco thus cleaned falls into the chute E and is delivered to the interior of the revolving sheet-metal cone F. This cone is made to revolve at such a speed that the longitudinal ribs $f'$ will carry the tobacco almost or quite to the top of the cone before the action of gravity causes it to fall. It then drops down through the central space of the cone and across the blast. The blast is so regulated that the leaf portion of the tobacco will be blown toward and out of the smaller end of the cone, while the stems, being of somewhat greater specific gravity than the leaves and presenting less surface to the blast, will fall out of the larger and lower end of the cone. The blast is regulated so that it will not be strong enough to counteract the tendency of gravity which causes the movement of the stems along the slanting lower side of the cone toward the larger end. The leaves or stock therefore pass out in the direction of the arrows $x$ and the stems in the direction of the arrows $y$.

If the tobacco composed of broken and mixed stems and leaves were subjected but once to the action of the blast of air, a complete separation would not be accomplished; but by combining the revolving cone having the longitudinal ribs and band $f^4$ with the blast the tobacco is dropped repeatedly through the blast until a complete separation is effected.

By making the tube F tapered and passing the blast through from the larger to the smaller end the speed of the current of air is maintained constant, or, perhaps, accelerated, for the reason that the cross-section of the tube gradually decreases, and therefore the leaves which are taken by the blast are readily carried through and out of the smaller end. By inclining the shaft $f$ sufficiently it will be obvious that we might use a cylindrical instead of a tapered tube F, although the action would not be so satisfactory for the reasons pointed out above.

Although I have described a tube of sheet metal, it will be understood that any other substance which will not permit the free passage of air through it—such as wood—may be used. The tube must be closed practically air-tight at the sides and open at the ends to operate in the manner set forth.

When it is desired simply to use the machine as a granulator, the belt to the blower may be thrown off and the belt $I^3$ substituted by a shorter belt, which will only drive the pulley $d'$ and the screen. In such case the chute E should be removed and a chute $l$ (shown in dotted lines in Fig. 2) should be attached to convey the tobacco from the screen D to the outside of the machine.

What we claim as our invention, and desire to secure by Letters Patent, is—

1. In a machine of the class described, the combination of the granulator, the revolving screen, and the separator consisting of the revolving tube closed excepting at its ends and having internal longitudinal ribs, the blower at one end of said tube arranged to produce a blast of air through the same, and chutes for conveying the material from the granulator to the screen and from the screen to the separator, substantially as described.

2. In a machine of the class described, the combination of the hopper, the granulator, the revolving screen, chutes for receiving the fine dirt and the tobacco, respectively, from said screen, the revolving tapered tube closed excepting at its ends and having internal longitudinal ribs, and the blower at the larger end of the tube, arranged to produce a blast of air through the same, substantially as described.

3. The combination of a revoluble tube having its lower side inclined to facilitate the discharge of the heavier particles from the lower end with a blower arranged to produce a current of air through the tube to discharge the lighter particles from the upper end, said tube being closed excepting at its ends and provided with inwardly-projecting longitudinal ribs, substantially as described.

4. The combination of a revoluble tapered tube closed excepting at its ends and having inwardly-projecting longitudinal ribs with a blower at the larger end of said tube, arranged to produce a current of air through the same from the larger to the smaller end, substantially as described.

5. In a machine of the class described, the combination, with a revolving tapered tube closed excepting at its ends and having internal longitudinal ribs and an inwardly-projecting circular rib near its larger end, of a blower at the larger end, arranged to produce a blast through the tube toward the smaller end, substantially as described.

In testimony whereof we affix our signatures in presence of two witnesses.

WILLIAM W. SMITH.
GEORGE R. HAYES.

Witnesses:
I. W. ALLEN,
HENRY EYSTER.